March 8, 1927.
G. TASMAN
1,619,836
JOINT
Filed Aug. 26, 1925
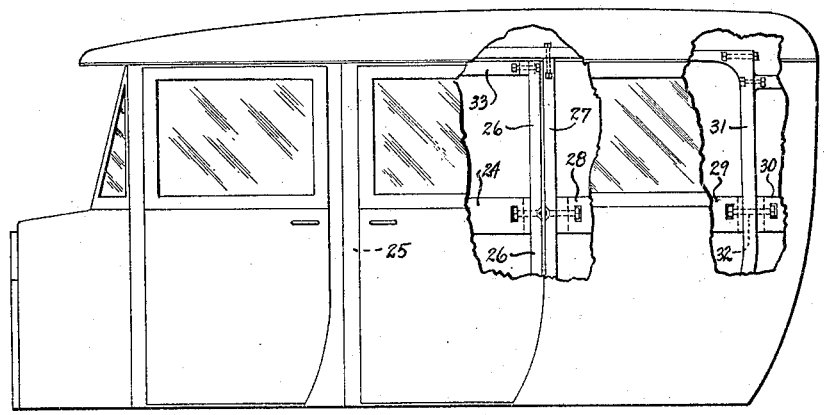
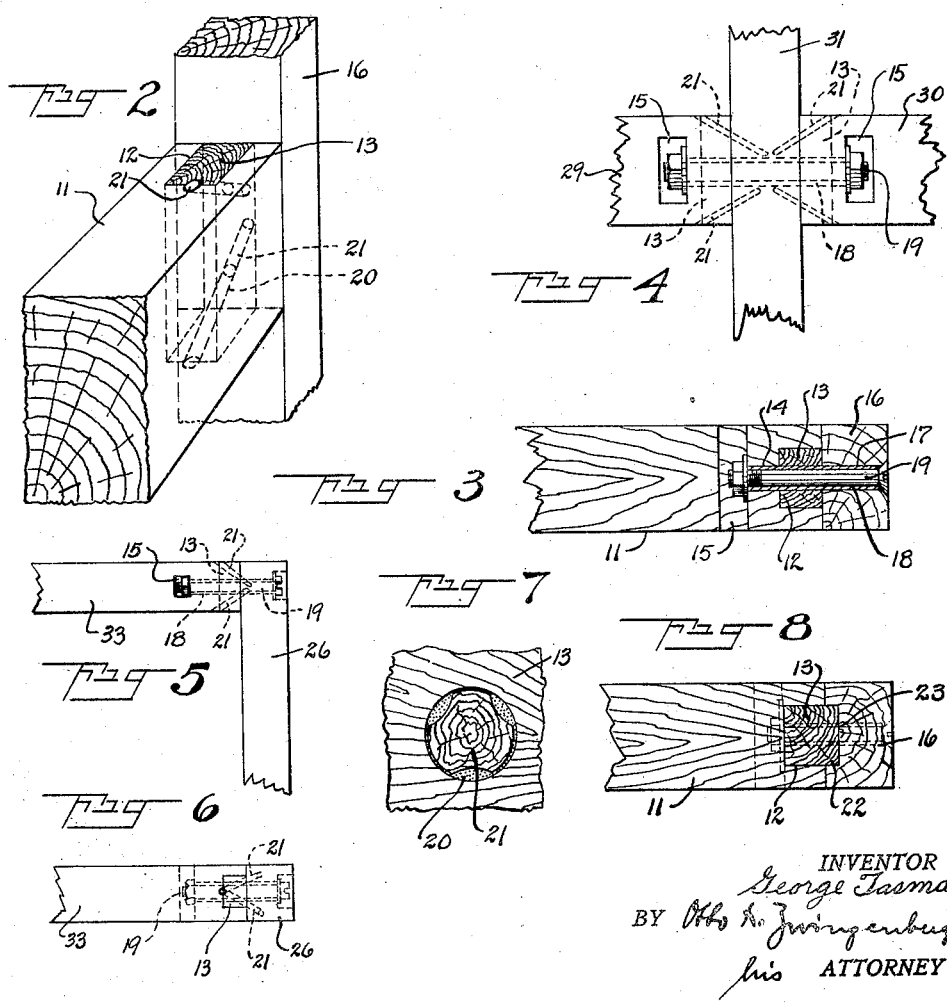
INVENTOR
George Tasman
BY
his ATTORNEY Patented Mar. 8, 1927.

1,619,836

UNITED STATES PATENT OFFICE.

GEORGE TASMAN, OF BROOKLYN, NEW YORK.

JOINT.

Application filed August 26, 1925. Serial No. 52,495.

This invention relates to joints and it particularly relates to joints of rails and pillars as they are applied in the construction of the bodies of all kinds of vehicles, such as automobiles, coaches, rail road cars, furniture, transportable houses and the like.

The objects of the invention are to provide means which will allow the joining of all kinds of rails and pillars in a quick and efficient manner, to dispense with the work of highly trained artisans in the preparation and assembling of the parts, to prepare by machinery all the parts to be joined and to give the parts such a form as will allow also their assembling by intelligent, though unskilled labor.

It is also an object of the invention to make these joints at a very much smaller cost than was heretofore possible.

And it is a further object of the invention to make the constructions in which these joints are to be embodied, of greater strength and resistency to withstand the strain exerted on them during use than was heretofore possible with the constructions where the parts were tenoned, or halved, to be joined. The subject matter of this application is already described, but not claimed in my co-pending application for vehicle bodies, filed under Serial No. 2,073.

For the further illustration of my invention I am going to describe the same in connection with the joints of pillars and rails applied in the construction of bodies for automobiles, where an exceptionally strong and durable body, at a reasonable cost, is highly desirable on account of the continuous shocks to which the chassis is exposed so that it is constantly shaking, which, owing to the usual connection of the chassis with the body, is highly deleterious to the same. Up to now the parts of an automobile body are usually tenoned, or halved, which is very costly in view of the high wages of the artisans and the long time it requires to make such a joint; moreover, these joints are not any too strong unless perfectly fitted because the one member to be provided with the female part is weakened on account of the removal of the material and the finished joint is subject to an enormous strain by the constant shaking of the parts when a car hits against the slightest obstruction.

For the better understanding of my invention I am going to illustrate the same by the accompanying drawings, in which Fig. 1 is a side elevation of an automobile body, the same being shown more in the form of a skeleton displaying the various pillars and rails to which the walls are to be fixed.

Fig. 2 is a perspective view of a joint between a pillar and a rail.

Fig. 3 is a plane, sectional view of a joint between a pillar and a rail.

Fig. 4 is a side view of a double joint of one rail each to each side of a pillar.

Fig. 5 is a side view of a modified form of my new joint between a pillar and a relatively narrow rail and Fig. 6 is a top view of the same.

Fig. 7 shows a detail view of a re-inforcing element in the form of a dowel as indicated for instance in Fig. 2.

Fig. 8 shows the key inserted in the horizontal rail slightly extended so as to reach into a corresponding recess in the rail.

Like numerals denote like parts throughout the various figures.

To make a strong joint between the pillars and the horizontal members of the body shell of an automobile and to make these joints by unskilled labor at a great reduction in the cost of manufacture I proceed as follows:

I provide at the ends of the horizontal belt rail 11 a groove 12 and secure therein with glue a key 13, care being taken that the long grain of this key runs in the same direction as that of the pillar, to which it is to be joined, as otherwise no proper union between said members will be obtained when glued together; then I bore a channel 14 from the center of the face of the rail 11 parallel to its edges to connect with the preferably rectangular opening 15 symmetrically located at the end of the channel 14. The pillar 16, which is to be joined to the belt rail 11, is also provided with a channel 17, of the same diameter as channel 14, at a predetermined point. Then the face of the rail 11 with the key 13 and the corresponding space around the orifice of the channel 17 on the pillar 16 are coated with glue, channels 14 and 17 registering with each other; then I insert a tube 18 tightly into the channel 17, 14 for almost the whole length of the same to protect the walls of the channels against the rubbing of the bolt 19 which I then insert into the tube 18 until the screw threaded end shows within the opening 15, where a washer and a nut are put over the thread and the joint is then well tightened by turning the nut.

The head of the bolt 19 is flat, but strong. Next I bore on the upper and lower side of the rail 11 a channel 20 in an angle of about 45 degrees, the center of the channel being about in the middle of the line of contact between the key 13 and the rail 11, through the key 13 into the pillar 16. Thereupon I fill the channel 20 with glue and insert then into the same a grooved pin or dowel 21 (Fig. 7) tightly so that the glue squeezes out and fills the groove so as to bring about a very good union between the pins and the walls of the adjoining parts; these pins disposed to each other in dove-tail fashion are very strong and serve as a re-inforcing member between the rails 11, key 13 and pillar 16 and they prevent also both any lateral perpendicular movement of the rail in the extremely rare case that the glue joint should have broken and the tightening of the screw bolt should have relaxed.

In case the width of the pillar 16 admits, I extend the key 13 for a slight fraction of an inch and provide a perpendicularly disposed shallow recess 23 in the same above and below the orifice of the channel 17 facing the rail 11, said recess being as long as rail 11 is high; this extension 22 of the key 13 is of course also coated with glue before it is inserted into the shallow recess 23, whereupon the pillar and the rail are joined as described above.

The joint between a pillar and a rail made as described above is applied in the body shell (Fig. 1) for instance in the construction of the door, said joints being made between the rail 24 and the pillars 25 and 26, and in the next adjoining joint between the pillar 27 and the belt rail 28.

Fig. 4 shows two rails joined to one pillar in a manner corresponding to that illustrated by Figs. 2 and 3, the only difference in this case being the use of a bolt with a screw thread on both its ends, one of the nuts serving as the flat head for the other end, otherwise all things being unchanged. Such a joint as illustrated by Fig. 4 is applied in the body shell, Fig. 1, for instance in the joint of the quarter belt rail 29 and of the back corner belt rail 30 to a quarter pillar 31, bolted together by a double ended bolt 32 in a manner otherwise as that illustrated by Figs. 2 and 3.

In case the rails and pillars to be joined are very narrow and do not afford space enough to make the aperture 15 sufficiently large to enter with a wrench to turn the nut, for instance in the case of the top door rail and of the pillars on either side of the said rail, then I make the aperture 15 just big enough to slide the nut into the same so that its bore will register with the orifice of the channel 14 and when I then insert the threaded bolt having a slot across its head and turn it with a screw driver, said bolt screws into the nut and tightens the joint; the dowels 21 are then inserted as described, but as the space is scarce in this case I prefer to introduce these dowels in a cross-wise direction to each other as illustrated by Fig. 6. This change, as illustrated by Figs. 5 and 6 is applied in the body shell in the joint between the top door rail 33 and the pillar 26.

The top rail 34 finally is joined to the pillar 27 in exactly the same manner as described in regard to the top door rail 33 and the pillar 26, the only difference in the joint of this top rail lies in the fact that the head of the bolt is not slotted, but is of the usual hexagonal shape, to be turned with the wrench, for the reason that the elevation of the head will not disturb.

It is understood that the joint as described may be applied in any construction consisting of such elements as rails, pillars and similar elements made of the various kinds of wood and eventually also of masses used nowadays so often as a substitute for wood, or of a combination of elements made of wood and of such substitutes; it is also understood that changes in the construction may be provided without deviating from or sacrificing the advantages of the spirit of the invention; for instance a plurality of grooves in the face end of the rails and pillars and a plurality of keys may be inserted in these furcated ends; or the rails may be joined in an oblique angle to the pillar instead of in a right angle as illustrated in the drawings and described above, but all such changes are coming within the scope of the appended claims.

The arrangement of the key 13 in the rail 11 and its operative relation with the aperture 15 is of great importance for several reasons; first, it allows tightening of the bolt 19 in case the shrinkage of the wooden parts causes the joint to loosen, for though in the construction of the automobile bodies well seasoned wood must be used, atmospheric influences can never be so fully controlled during work so as to later on absolutely exclude shrinkage of the parts of the finished automobile body; secondly it allows also reduction of certain steps in the making of the joint as eventually the slot for the key 13 can be part of the aperture 15 and can therefore be made by one operation; this is especially evident by the one change which would also fall under the scope of the appended claims, this change consisting in joining two rails, furcated as described above, parallel in some distance from each other to one key and then joining this composite rail by means of the key and the bolt to the pillar as described above, the open space allowed by the distance between the two rails serving as the aperture provided to turn the nut engaging the bolt passing through the pillar and key.

What I claim is:

1. A joint between a wooden pillar and a wooden rail, said joint comprising a pillar, a rail furcated at its end facing aforesaid pillar, a key, arranged within and glued to the aforesaid furcated end and into a recess in the pillar, having its grain running in the same direction as that of the pillar, an aperture, spacious enough to operate the nut of a bolt therein, arranged in the rail in a short distance from its furcated end, a channel, bored through the pillar and extended in a longitudinally central direction through the key until it connects with the aforesaid aperture, a tube within and fitting tightly into aforesaid channel, a bolt arranged in aforesaid tube projecting with its screw-threaded end into aforesaid aperture, a washer and a nut tightened on the threaded end of said bolt, holes in an oblique direction through the rail and the key into the pillar, and a grooved pin glued within and filling each of aforesaid holes.

2. A joint between a wooden pillar and a wooden rail, said joint comprising a pillar, a rail furcated at its end facing the pillar, a key arranged within and glued to the aforesaid furcated end with its grain running in the same direction as that of the pillar, an aperture, spacious enough to operate a nut of a bolt therein, arranged in the rail in a short distance from its furcated end, a channel bored through the pillar and extended in a longitudinally central direction through the key until it connects with aforesaid aperture, a tube within and fitting tightly into aforesaid channel, a flat headed bolt, arranged in said tube, projecting with its screw-threaded end into aforesaid aperture, a washer and a nut tightened on the threaded end of said bolt, holes arranged in an oblique direction on the upper and lower side of the rail passing from the same through the key into the pillar, and a grooved pin glued within and filling each of aforesaid holes.

3. In a bolted joint between a pillar and a rail adhering together by means of a key arranged within the furcated end of the rail so as to have its grain in the same direction as that of the pillar, the combination comprising a bolt passing through a channel in the pillar, the rail and the key substantially equidistantly from the upper and lower side of the rail and projecting into an aperture, spacious enough to handle a nut therein, in the side of the said rail, a metal tube, of slightly smaller length than the channel, fitted in tightly between the shank of the bolt and the walls of the channel, and a nut engaging the threaded end of the bolt.

4. In a joint between a pillar and a rail glued together by a key arranged within the furcated end of the rail and tightened by a bolt arranged within the pillar and the rail, a plurality of pins leading in an oblique direction from the rail through the key into the pin and being secured in aforesaid members.

In witness whereof I have hereunto set my name and signature this 13th day of August, 1925.

GEORGE TASMAN.